(12) United States Patent
Thomas et al.

(10) Patent No.: US 7,440,088 B2
(45) Date of Patent: Oct. 21, 2008

(54) METHODS AND DEVICES FOR MEASURING A CONCENTRATED LIGHT BEAM

(75) Inventors: Timothy N. Thomas, Portland, OR (US); Bruce Adams, Portland, OR (US); Dean C. Jennings, Beverly, MA (US)

(73) Assignee: Applied Materials, Inc., Santa Clara, CA (US)

( * ) Notice: Subject to any disclaimer, the term of this patent is extended or adjusted under 35 U.S.C. 154(b) by 334 days.

(21) Appl. No.: 11/261,439

(22) Filed: Oct. 28, 2005

(65) Prior Publication Data

US 2006/0158641 A1   Jul. 20, 2006

Related U.S. Application Data

(60) Provisional application No. 60/623,720, filed on Oct. 28, 2004.

(51) Int. Cl.
   *G01J 1/00* (2006.01)
(52) U.S. Cl. .................. 356/121; 356/127; 356/226
(58) Field of Classification Search ......... 356/121–127, 356/213–226
   See application file for complete search history.

(56) References Cited

U.S. PATENT DOCUMENTS

| | | | |
|---|---|---|---|
| 4,425,907 A * | 1/1984 | Younghouse | ............... 385/141 |
| 4,848,902 A * | 7/1989 | Schickle et al. | ............. 356/121 |
| 4,885,471 A * | 12/1989 | Telfair et al. | ............. 250/461.1 |
| 5,459,565 A | 10/1995 | Aharon et al. | |
| 5,922,617 A * | 7/1999 | Wang et al. | ................. 436/518 |
| 6,114,704 A | 9/2000 | Buck et al. | |
| 6,242,292 B1 | 6/2001 | Yamazaki et al. | |
| 6,365,870 B1 | 4/2002 | Petring et al. | |
| 6,393,042 B1 | 5/2002 | Tanaka | |
| 6,531,681 B1 | 3/2003 | Markle et al. | |

FOREIGN PATENT DOCUMENTS

| | | |
|---|---|---|
| DE | 3738480 A1 | 5/1989 |
| WO | WO 03/064983 A | 8/2003 |
| WO | WO 03089184 | 10/2003 |

* cited by examiner

*Primary Examiner*—L. G. Lauchman
*Assistant Examiner*—Iyabo S Alli
(74) *Attorney, Agent, or Firm*—Townsend and Townsend and Crew, LLP

(57) ABSTRACT

Methods and devices are provided for profiling a beam of light that includes a wavelength $\lambda$. The beam of light is received. Secondary light is generated at a wavelength $\lambda'$ different from wavelength $\lambda$ by fluorescing a material with the received beam of light. The secondary light is separated from the received beam of light. The separated secondary light is optically directed to a sensor.

14 Claims, 5 Drawing Sheets

Fig. 4A  Fig. 4B

METHODS AND DEVICES FOR MEASURING A CONCENTRATED LIGHT BEAM

CROSS REFERENCE TO RELATED APPLICATION

This application is a nonprovisional of, and claims the benefit of the filing date of, U.S. Prov. Pat. Appl. No. 60/623,720, entitled "METHODS AND DEVICES FOR MEASURING A CONCENTRATED LIGHT BEAM," filed Oct. 28, 2004 by Timothy N. Thomas, the entire disclosure of which, including the Appendix, is incorporated herein by reference for all purposes. The Appendix to U.S. Prov. Pat. Appl. No. 60/623,720 corresponds to published PCT application WO 03/089,184 and is sometimes referred to herein as "the Thermal Flux Processing application."

BACKGROUND OF THE INVENTION

Concentrated light beams, such as are provided by certain lasers, are used in a variety of different applications. One characteristic of such beams that makes them valuable in these varied applications is their ability to deliver a highly concentrated beam of optical power as a collimated beam that provides precision in position, size, and distribution at high intensity levels. The quality of this performance may, however, be impaired by degradation of the quality of the light beam, such as may result from aging of components, vibration and shock, deterioration of a lasing medium, thermal drift, poor optical alignment, and various other sources of component nonlinearity. A change in the intensity profile of the light beam, even if there is no change in the total power output of the beam, may have significant adverse consequences on performance.

Because of these concerns, it is useful for the light beam to be profiled periodically so that the intensity profile may be evaluated. A challenge in performing such profiling is the intensity of the beam itself since the very high power transfer may damage the profiling device. In particular, many conventional beam-profiling systems face difficulties when beam power density approach values on the order of thousands of watts per square centimeter.

There is accordingly a general need in the art for methods and devices that permit profiling of concentrated light beams.

BRIEF SUMMARY OF THE INVENTION

Embodiments of the invention make use of a fluorescent material that radiates light at a different wavelength than the wavelength of the light beam to be profiled, using this radiated light to evaluate the light beam. In some embodiments, a method is thus provided for profiling a beam of light that includes a wavelength $\lambda$. The beam of light is received. Secondary light is generated at a wavelength $\lambda'$ different from wavelength $\lambda$ by fluorescing a material with the received beam of light. The secondary light is separated from the received beam of light. The separated secondary light is optically directed to a sensor.

In some embodiments, the fluorescent material is disposed within a portion of the received beam of light, and the beam of light is moved relative to the fluorescent material. For example, the beam of light may be incident on a cylinder having an axis substantially orthogonal to an incident direction of the beam of light so that the beam of light is moved relative to the fluorescent material by rotating the cylinder about the axis. In another instance, the beam of light is incident on a disk having an axis substantially parallel to an incident direction of the beam of light, with the beam of light being moved relative to the fluorescent material by rotating the disk about the axis; the sensor may also be rotated about the axis of the disk. The directed separated secondary light may be focused onto the sensor. In addition, the directed separated secondary light may be filtered to block light at wavelength $\lambda$. In one embodiment, $\lambda$ is approximately 808 nm and $\lambda'$ is approximately 1064 nm. The beam of light may be substantially monochromatic in an embodiment.

In other embodiments, a device is provided for profiling a beam of light that includes a wavelength $\lambda$. The device comprises a body, a fluorescent material, a light sensor, and an optical arrangement. The fluorescent material is disposed proximate a surface of the body oriented to receive the beam of light. The fluorescent material radiates at a wavelength $\lambda'$ different from wavelength $\lambda$ in response to excitation by the beam of light, and the body is substantially transparent to wavelengths $\lambda$ and $\lambda'$. The optical arrangement is adapted to separate the light at wavelength $\lambda'$ from the beam of light and to direct the light at wavelength $\lambda'$ to the light sensor.

The fluorescent material may be disposed on the surface of the body, such as in one embodiment where it is comprised by a film deposited over the surface of the body, or it may be disposed within the body under the surface of the body. The optical arrangement may include a surface within the body that substantially transmits light having a wavelength of one of $\lambda$ and $\lambda'$ and substantially reflects light having a wavelength of the other of $\lambda$ and $\lambda'$. In one embodiment, the optical arrangement includes a lens disposed to focus the light directed to the light sensor onto the light sensor. The optical arrangement may further include a filter having transmission characteristics that block transmission of light having wavelength $\lambda$ disposed to filter the light focused onto the light sensor. In different embodiments, the light sensor may comprise a photodetector or may comprise a camera. In one embodiment, $\lambda$<1000 nm and the fluorescent material comprises Nd:YAG.

Different structures for the body may be accommodated. In one embodiment, the body comprises a hollow cylinder having an axis substantially orthogonal to an incident direction of the beam of light. The optical arrangement includes a surface within a hollow portion of the hollow cylinder that substantially transmits light having a wavelength of one of $\lambda$ and $\lambda'$ and substantially reflects light having a wavelength of the other of $\lambda$ and $\lambda'$. A motor coupled with the body may rotate the hollow cylinder about the axis. In another embodiment, the body comprises a disk having an axis substantially parallel to an incident direction of the beam of light. A motor coupled with the body may rotate the disk and the optical arrangement about the axis.

A further understanding of the nature and advantages of the present invention may be realized by reference to the remaining portions of the specification and the drawings.

BRIEF DESCRIPTION OF THE DRAWINGS

FIGS. 4A-4C are schematic side, end, and isomorphic-projection views of a device for measuring a concentrated light beam in a further embodiment;

DETAILED DESCRIPTION OF THE INVENTION

Figure 1:
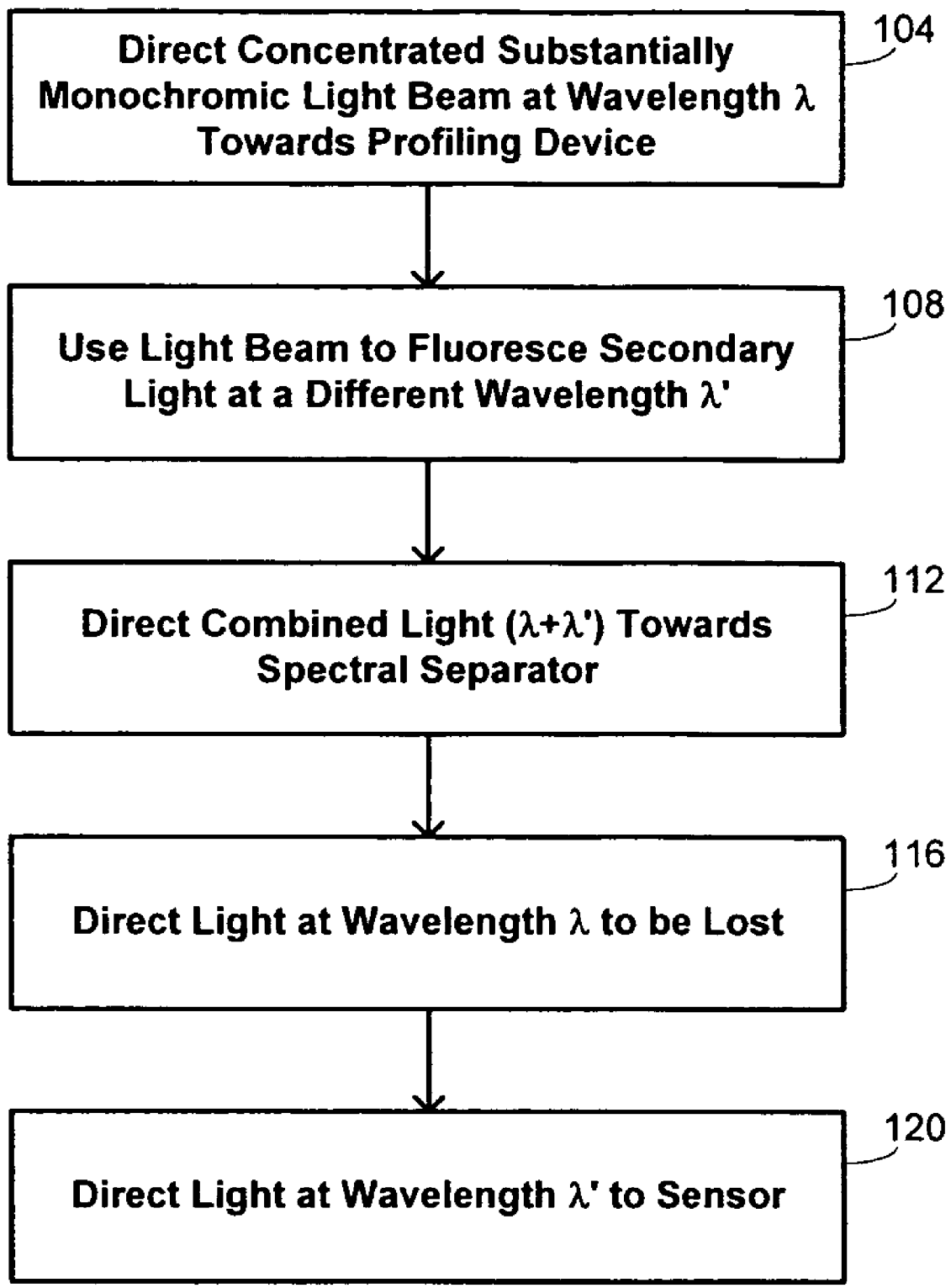
FIG. 1 is a flow diagram summarizing methods of the invention in certain embodiments.

Embodiments of the invention make use of a material that fluoresces in response to the energy flow provided by the concentrated beam of light. The invention was developed by the inventors during the course of their work on a thermal processing system like the one described in detail in the Thermal Flux Processing application, but the invention is not limited to such applications and may be used more generally in profiling concentrated light beams that are used in other applications as well. In the thermal processing system described in the Thermal Flux Processing application, the concentrated light beam is provided by a continuous-wave radiation source, and is collimated and focused by an optical arrangement into a line of radiation extending across a substrate surface as part of a process for semiconductor-device manufacture. Heat generated at the surface of the target by the concentrated light raises the temperature to high values useful for annealing in a time frame short enough to prevent diffusion. While embodiments of the invention are suitable for use with continuous-wave light sources like the one described in the Thermal Flux Processing application, other embodiments may be used to profile concentrated light provided as bursts, pulses, or flashes. Furthermore, while the optical arrangement described in the Thermal Flux Processing application is used to focus the light into a line, different embodiments of the invention may be used to profile other geometric configurations of concentrated light.

In many embodiments, the concentrated beam of light is substantially monochromatic. For a specific application described in the Thermal Flux Processing application in which a silicon substrate is used, the concentrated light has a wavelength between about 190 nm and 950 nm, with a specific example of light having a wavelength of 808 nm being described. In some of the discussion below, this example is also discussed for purposes of illustration, but the invention is not limited to any particular wavelength for the concentrated beam of light. Furthermore, the invention is not limited to profiling of monochromatic beams of light and embodiments may be applied to other beams that have stable spectra.

The fluorescent light generated by the interaction of the concentrated beam of light with the fluorescent material has generally the same intensity profile as the concentrated beam of light, but at a significantly reduced overall intensity and generally at a different wavelength. For example, in some embodiments, the fluorescent material comprises neodymium:(yttrium aluminum garnet) ("Nd:YAG"), which responds to the 808-nm light beam by fluorescing at a wavelength of 1064 nm. An optical arrangement is used to separate the resulting combination of 808-nm and 1064-nm light, directing the high-intensity 808-nm light so that it is lost and directing the low-intensity 1064-nm light to a sensor. The low-intensity 1064-nm light is profiled with the results obtained from the detector and used as an indicator of the profile of the high-intensity 808-nm light. Because the profiling is performed with light of a lower intensity there is insignificant risk of heating the measuring sensor to the point that it melts, evaporates, or is otherwise damaged by the intensity of the light.

FIG. 1 provides a generalized overview of different embodiments of the invention. At block 104, a concentrated, a light beam that includes a wavelength $\lambda$ is directed towards a profiling device. The light beam is used at block 108 to fluoresce secondary light from a fluorescent source at a different wavelength $\lambda'$. The combined light at wavelengths $\lambda$ and $\lambda'$ is directed towards a spectral separator at block 112 to separate the light into its individual wavelength components. The optical structure of the profiling device causes the light at wavelength $\lambda$ to be lost, as indicated at block 116, and causes the light at wavelength $\lambda'$ to be directed to the sensor for measurement.

Figure 2:
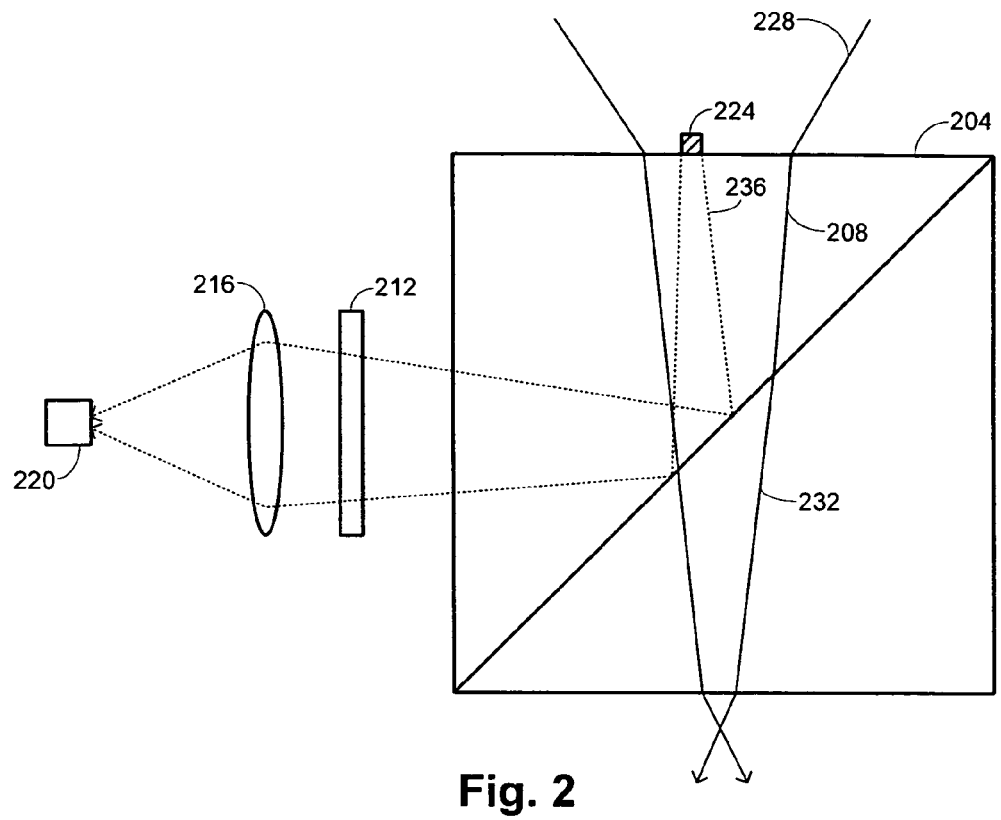
FIG. 2 is a schematic illustration of a device for measuring a concentrated light beam in one embodiment.

One specific embodiment for the profiling device is illustrated schematically in FIG. 2. The profiling device comprises a block 204 of material, such as glass, that is generally transparent to light at wavelengths $\lambda$ and $\lambda'$. The block 204 may comprise an intermediate surface 208 that is substantially reflective at one of the two wavelengths and substantially transmissive at the other of the two wavelengths. For instance, the optical block 204 may comprise halves of a rectangular prism that have been joined along their respective hypotenuses after one of the surfaces has been coated with an optical coating having the desired transmission/reflection characteristics. In the specific illustration, the optical coating is transmissive at wavelength $\lambda$, which is the wavelength of the light beam 228 incident on the profiling device, and is reflective at wavelength $\lambda'$, which is the wavelength of the secondary light generated by the fluorescent source 224. In the embodiment of FIG. 2, the fluorescent source 224 is provided as a dot-like structure, although a variety of different geometric patterns may be used in alternative embodiments, including a line structure, a plurality of separated dot-like structures, a combination of line and dot-like structures, or other geometric patterns. The fluorescent source 224 is positioned proximate a surface of the body 204 such that the incident light beam 228 encounters the fluorescent source 224 to generate the secondary light. The fluorescent source 224 may be disposed on the surface of the body 204 or may be implanted below the surface of the body.

The secondary light 236 is focused onto a sensor 220 by another part of the optical arrangement. The specific embodiment shown in FIG. 2 uses a lens 216 to focus the light, but any arrangement of lenses and/or reflective surfaces such as mirrors may be used to accomplish the focusing. In some embodiments, an optical component designed to increase collection of incoming rays, such as a Winston cone, may be used. The optical arrangement may also conveniently comprise a filter 212 that is transmissive at wavelength $\lambda'$ but opaque at wavelength $\lambda$ along the path of the secondary light 236 to ensure that no stray light from the initial beam 228 is directed onto the sensor 220. While the filter 212 is shown disposed to encounter the secondary light 236 prior to an encounter with the lens 216, the order of encounters may be reversed, with the secondary light 236 encountering the lens before it encounters the filter 212. The sensor 220 may comprise a photodetector of the type known in the art. By moving the beam or the optical arrangement, such as by moving the prism block 204, the lens 216, the filter 212, and the sensor 220 in concert, the output of the sensor 220 is representative of the light intensity profile of the incident beam 228.

Figure 3:
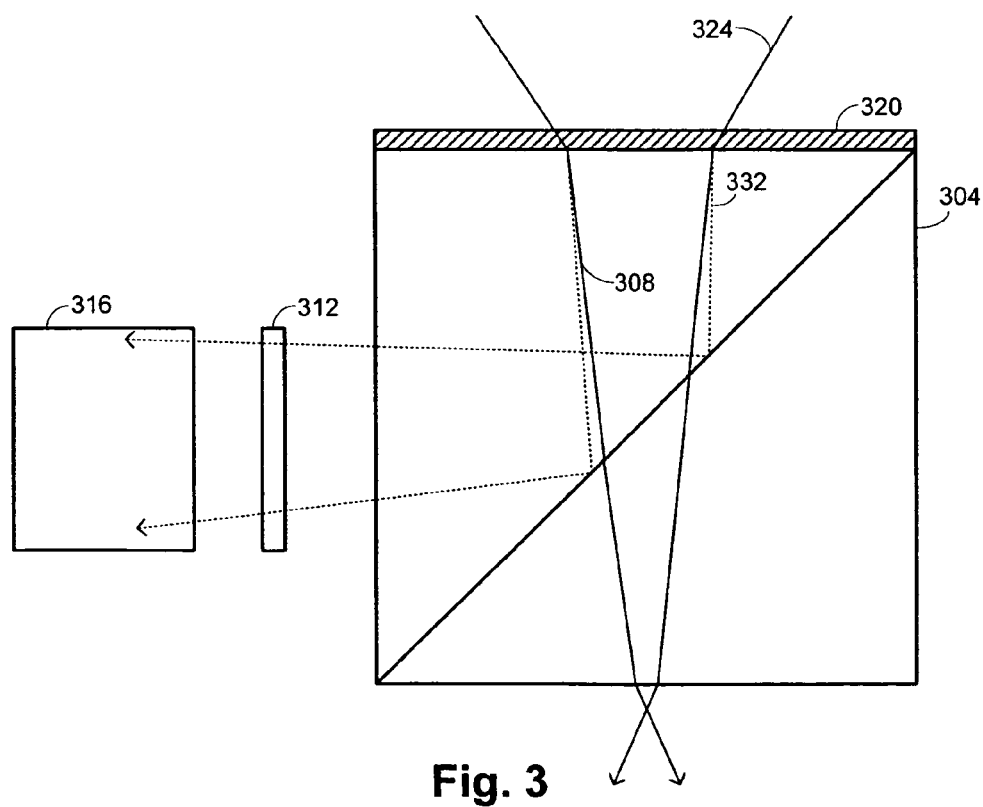
FIG. 3 is a schematic illustration of a device for measuring a concentrated light beam in another embodiment.

An alternative embodiment is illustrated in FIG. 3, and also uses a block 304 of material that is substantially to light at wavelengths $\lambda$ and $\lambda'$, and includes an intermediate surface 308 substantially reflective to one of the wavelengths and substantially transmissive to the other of the wavelengths. Instead of providing discrete sources or another geometric pattern of fluorescent material, the block 304 is coated with a film 320 of fluorescent material or is implanted with the fluorescent material. The profiling device otherwise functions similarly to the description provided in connection with FIG. 2, with an incident beam of light 324 interacting with the film 320 of fluorescent material to generate secondary light 332. The original light at wavelength $\lambda$ and the secondary light at wavelength $\lambda'$ are directed in different directions by interacting with the intermediate surface 308. As before, it does not matter which wavelength is reflected and which wavelength is transmitted, although FIG. 3 illustrates the specific case where $\lambda'$ reflected and $\lambda$ is transmitted. The secondary light is directed to a sensor for imaging.

FIG. 3 also illustrates a further variant in the form of the sensor, which may be provided as a camera 316 capable of detecting light imaged over the surface of the block 304. In this way, the full incident beam 324 may be profiled without moving the beam 324 or optical arrangement. A filter 312 that transmits light at wavelength $\lambda'$ but that is substantially opaque at wavelength $\lambda$ may conveniently be positioned along the path of the secondary light to prevent stray light at wavelength $\lambda$ from reaching the camera 316. The camera 316 may be a charge-coupled device or other type of camera in different embodiments.

Figure 4C:
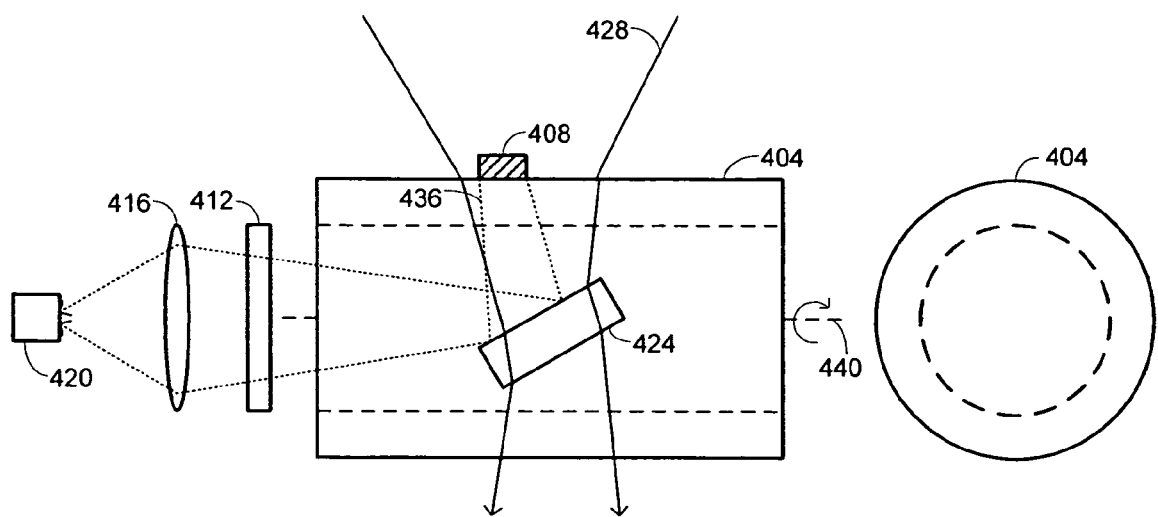
Figure 4C:
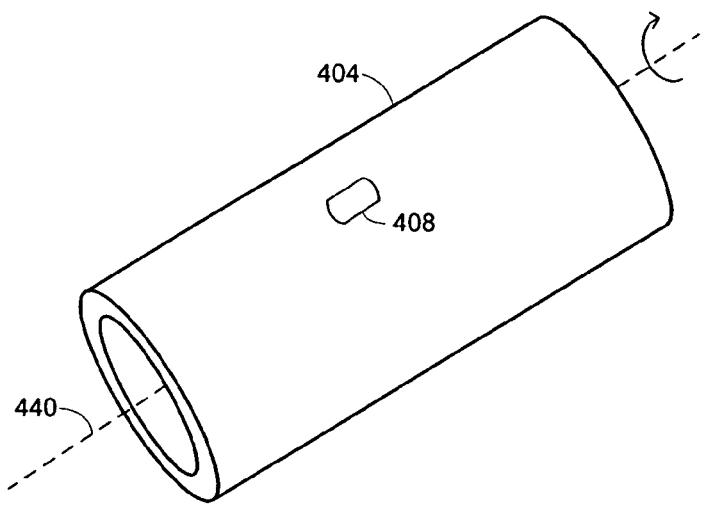
Figure 5A:
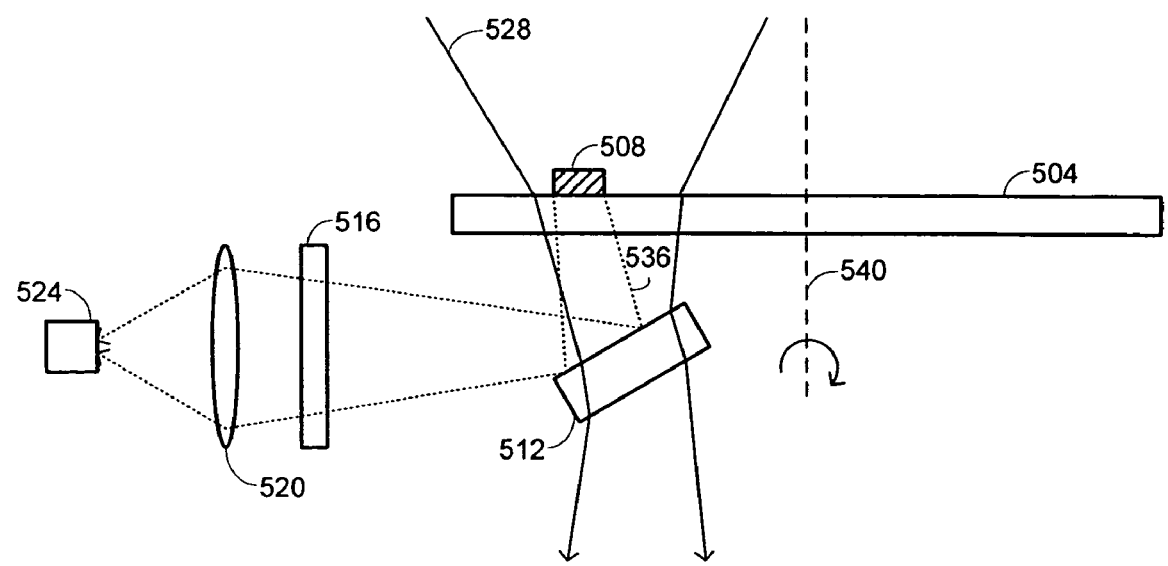
FIGS. 5A and 5B are schematic side and isomorphic-projection views of a device for measuring a concentrated light beam in still another embodiment.
Figure 5B:
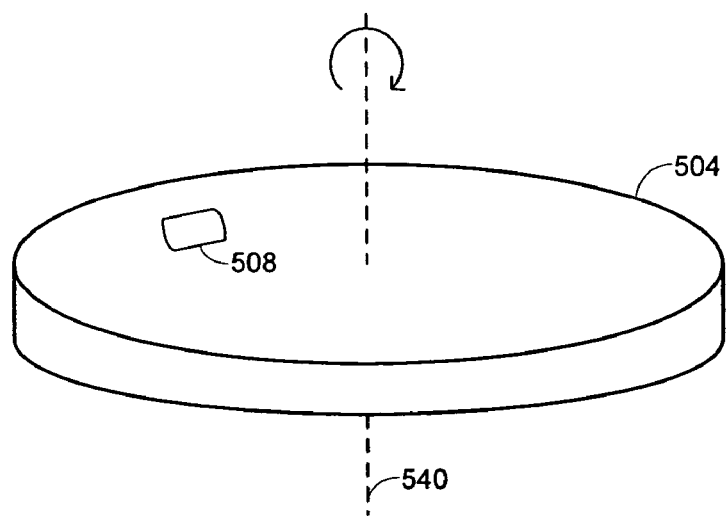

Alternative arrangements for accomplishing the motion used to profile the entire incident beam are illustrated in FIGS. 4A-5B, with FIGS. 4A-4C illustrating one embodiment and FIGS. 5A-5B illustrating an alternative embodiment. In each of these embodiments, the same general structure is illustrated for the portion of the optical arrangement that focuses the secondary light onto the detector. The structure is shown as comprising a filter that transmits light of wavelength $\lambda'$ but not light of wavelength $\lambda$, and a focusing lens, but may include additional or alternative optical components such as a Winston cone to increase collection of light rays.

The embodiment illustrated in FIGS. 4A-4C is shown with a side view in FIG. 4A, an end view in FIG. 4B, and an isometric-projection view in FIG. 4C. This embodiment uses a cylinder 404 transparent at wavelengths $\lambda$ and $\lambda'$, with at least a portion of the optical arrangement disposed within the transparent cylinder 404. Positioning of the portion of the optical arrangement disposed within the cylinder 404 is simplified when the cylinder 404 is provided as a hollow cylinder so that optical components may be placed within the hollow portion. The cylinder 404 is coupled with a motor (not shown) configured to rotate the cylinder about an axis 440. Such rotation permits fluorescent material 408 disposed in a geometric pattern on a surface of the cylinder 404 to be moved into different positions, with the rotational position being synchronized with the location of the fluorescent material. A beam of light 428 at wavelength $\lambda$ incident on the cylinder 404 causes the fluorescent material to emit secondary light 436 at wavelength $\lambda'$. The combined light is separated with an optical component 424 that directs the secondary light to be directed towards the sensor 420, being focused with a lens 416 and perhaps additionally filtered by a filter 412 as described above in connection with other embodiments. The separation of the combined light may be accomplished by using a structure similar to that described above. In particular, optical component 424 may comprise a block of material that is transparent at wavelength $\lambda$, covered by a coating that reflects light at wavelength $\lambda'$ and transmits light at wavelength $\lambda$. In alternative embodiments, the reflective and transmissive properties may be reversed so that the secondary light at wavelength $\lambda'$ is transmitted and then directed to a portion of the optical arrangement that focuses and senses the light.

A further variant is illustrated in FIGS. 5A and 5B, which respectively provide a side and isomorphic-projection view of an embodiment that uses a rotating disk 504. The disk 504 is formed of a material that is transparent to light at wavelengths $\lambda$ and $\lambda'$ and includes fluorescent material 508 disposed on a surface of the disk 504 in a geometric pattern like those described above. The optical arrangement is similar to that described in connection with FIGS. 4A-4C, with an optical component 512 being provided to reflect light of one of the wavelengths $\lambda$ and $\lambda'$ and to transmit light of the other wavelength. A beam of light 528 incident on the disk 504 causes the fluorescent material 508 to generate secondary light 536 that is thereby focused onto a sensor 524 with a lens 520, perhaps after being filtered by a filter 516 to prevent stray light from reaching the sensor 524. The disk 404 and optical arrangement are coupled with a motor (not shown) that causes rotation about axis 540 so that different portions of the incident beam 528 may successively be imaged by the sensor 524.

Figure 6:
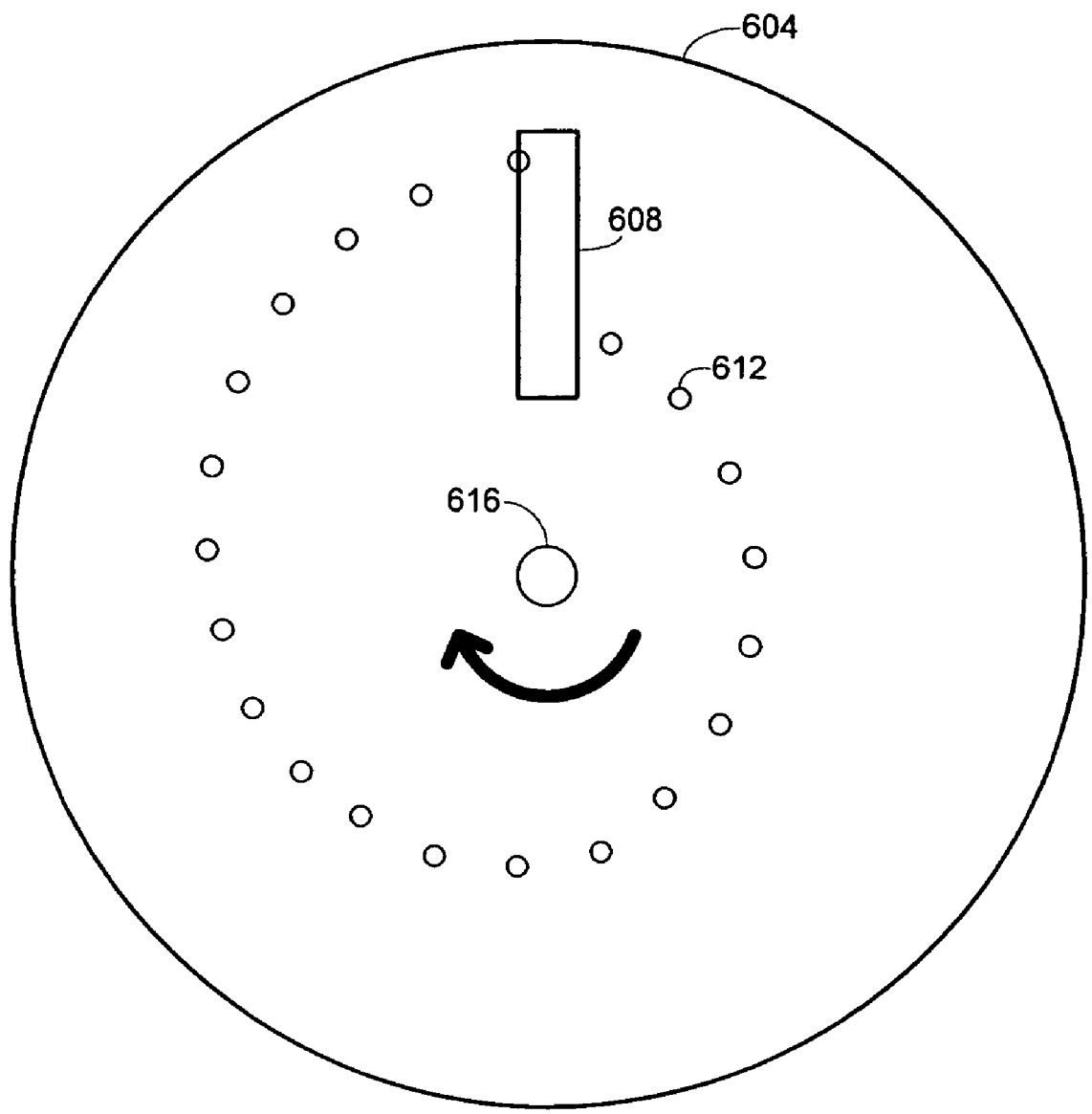
FIG. 6 is a top view of a device for measuring a concentrated light beam in an additional embodiment.

A further alternative is illustrated with FIG. 6, which provides a top view of another embodiment that uses a rotating disk 604. A plurality of dots 612 of fluorescent material are distributed about the disk in a spiral pattern so that as the disk 604 rotates about axis 616, different ones of the dots 612 are exposed to the beam 608 at different radial distances from the axis 616. In some embodiments, the disk 604 is rotated rapidly so that each of the dots 612 is exposed repeatedly to the beam 608 but for a relatively short period of time. In such instances, a single detector may be used to collect the secondary light, and cross talk between pixels may be minimized. An additional advantage that results from rapidly spinning the disk is that any heat adsorbed from the beam is distributed over a relatively large volume, which is related to the duty cycle of the dots, thereby increasing the maximum usable power density. For purposes of illustration, the inventors have calculated that a disk having a diameter of 12 cm may yield about a 4-µm resolution in the slow axis and dot-size limited in the fast axis.

The specific embodiments described above are intended to be illustrative of different aspects of the invention, and there are a number of alternatives that may be used, particularly in separating the combined $\lambda$ and $\lambda'$ light and in directing the secondary light to the sensor. For example, the separation of the light has been described in each of the embodiments with use of a coating that transmits light at one of the wavelengths and reflects light at the other of the wavelengths. Such a structure has the advantage that substantially the entire strength of the secondary light is retained and directed to the sensor, particularly when the optical arrangement also comprises a component designed to improve light collection such as a Winston cone. In other embodiments, however, other techniques for separating substantially dichromatic light may be used, even if such techniques result in some loss in intensity of the secondary light. For example, an arrangement in which the dichromatic light is initially focused and directed to a splitter, with one output of the splitter being further directed to a filter that passes only light of wavelength $\lambda'$ could be used to collect the secondary light. This and other similar arrangements may be combined with the structures otherwise described in connection with FIGS. 2-6.

Furthermore, in other alternative embodiments, the use of a fluorescent material may be avoided by providing scattering features that act to scatter light at the wavelength $\lambda$ of the incident beam, thereby significantly reducing its intensity so that it may be sampled by the sensor. Such scattering features may be placed on the surface of, or embedded with, the transparent structures 204, 304, 404, and 504 described above. The detection of light may then be performed without including a filter that blocks transmission at the wavelength $\lambda$ of the incident light.

Having described several embodiments, it will be recognized by those of skill in the art that further modifications, alternative constructions, and equivalents may be used without departing from the spirit of the invention. Accordingly, the above description should not be taken as limiting the scope of the invention, which is defined in the following claims.

What is claimed is:

1. A method for profiling a beam of light that includes a wavelength $\lambda$, the method comprising:
   rotating a disk about the axis of the disk, wherein the disk includes a series of discrete fluorescent dots disposed in a spiral around the disk;
   receiving the beam of light on the disk along an axis substantially parallel to an incident direction of the beam of light;
   generating secondary light at a wavelength $\lambda'$ different from wavelength $\lambda$ by fluorescing a fluorescent material with the received beam of light;
   separating the secondary light from the received beam of light; and
   optically directing the separated secondary light to a sensor.

2. The method recited in claim 1 further comprising focusing the directed separated secondary light onto the sensor.

3. The method recited in claim 1 further comprising filtering the directed separated secondary light to block light at wavelength $\lambda$.

4. The method recited in claim 1 wherein $\lambda$ is approximately 808 nm and $\lambda'$ is approximately 1064 nm.

5. The method recited in claim 1 wherein the beam of light is substantially monochromatic.

6. A device for profiling a beam of light that includes a wavelength $\lambda$, the device comprising:
   a prism;
   a film of fluorescent material disposed over a surface of the prism oriented to receive the beam of light, wherein:
   the fluorescent material radiates light at a wavelength $\lambda'$ different from wavelength $\lambda$ in response to excitation by the beam of light; and
   the prism is substantially transparent to wavelengths $\lambda$ and $\lambda'$;
   a light sensor; and
   an optical arrangement adapted to separate the light at wavelength $\lambda'$ from the beam of light and to direct the light at wavelength $\lambda'$ to the light sensor.

7. The device recited in claim 6 wherein the optical arrangement includes a surface within the prism that substantially transmits light having a wavelength of one of $\lambda$ and $\lambda'$ and substantially reflects light having a wavelength of the other of $\lambda$ and $\lambda'$.

8. The device recited in claim 6 wherein the optical arrangement includes a lens disposed to focus the light directed to the light sensor onto the light sensor.

9. The device recited in claim 8 wherein the optical arrangement further includes a filter having transmission characteristics that block transmission of light having wavelength $\lambda$ disposed to filter the light focused onto the light sensor.

10. The device recited in claim 6 wherein the light sensor comprises a photodetector.

11. The device recited in claim 6 wherein the light sensor comprises a camera.

12. The device recited in claim 6 wherein $\lambda < 1064$ nm and the fluorescent material comprises Nd:YAG.

13. The device recited in claim 6 wherein $\lambda < 1064$ nm and the fluorescent material comprises Nd ions embedded in a glass.

14. The device recited in claim 5 wherein the beam of light is substantially monochromatic.

* * * * *